US008652978B2

(12) United States Patent
Dejneka et al.

(10) Patent No.: US 8,652,978 B2
(45) Date of Patent: *Feb. 18, 2014

(54) GLASSES HAVING IMPROVED TOUGHNESS AND SCRATCH RESISTANCE

(75) Inventors: Matthew John Dejneka, Corning, NY (US); Adam James Ellison, Painted Post, NY (US); Sinue Gomez, Corning, NY (US); Robert Michael Morena, Lindley, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,581

(22) Filed: Aug. 17, 2012

(65) Prior Publication Data

US 2012/0308803 A1 Dec. 6, 2012

Related U.S. Application Data

(63) Continuation of application No. 12/277,573, filed on Nov. 25, 2008.

(60) Provisional application No. 61/004,677, filed on Nov. 29, 2007.

(51) Int. Cl.
*C03C 3/091* (2006.01)

(52) U.S. Cl.
USPC .................................. 501/66; 501/69; 501/70

(58) Field of Classification Search
USPC .......................... 501/66, 69, 70; 428/410, 426
See application file for complete search history.

(56) References Cited

U.S. PATENT DOCUMENTS

| | | | |
|---|---|---|---|
| 4,298,389 A | 11/1981 | Johnson et al. | |
| 4,926,006 A | 5/1990 | Kawamura et al. | |
| 5,036,030 A | 7/1991 | Taga et al. | |
| 5,277,946 A * | 1/1994 | Nagai et al. | 428/426 |
| 5,721,181 A | 2/1998 | Sehgal et al. | |
| 5,741,745 A | 4/1998 | Sehgal et al. | |
| 6,268,304 B1 * | 7/2001 | Maeda et al. | 501/65 |
| 6,794,323 B2 * | 9/2004 | Peuchert et al. | 501/66 |
| 6,946,414 B2 | 9/2005 | Bitossi et al. | |
| 7,534,734 B2 * | 5/2009 | Ellison | 501/66 |
| 7,666,511 B2 * | 2/2010 | Ellison et al. | 428/426 |
| 7,960,301 B2 * | 6/2011 | Niida et al. | 501/56 |
| 2001/0038929 A1 | 11/2001 | Uhlik et al. | |
| 2003/0109370 A1 | 6/2003 | Ikenishi et al. | |
| 2005/0096210 A1 | 5/2005 | Kawai | |
| 2005/0137075 A1 | 6/2005 | Messerschmidt et al. | |
| 2005/0209084 A1 * | 9/2005 | Takaya et al. | 501/11 |
| 2006/0205583 A1 * | 9/2006 | Naumann et al. | 501/66 |
| 2009/0142568 A1 * | 6/2009 | Dejneka et al. | 428/220 |
| 2011/0045961 A1 * | 2/2011 | Dejneka et al. | 501/66 |

FOREIGN PATENT DOCUMENTS

| | | |
|---|---|---|
| EP | 1106586 | 10/2005 |
| JP | 11310432 | 11/1999 |
| JP | 2005162600 | 6/2005 |
| JP | 2007031211 | 2/2007 |
| WO | WO 2007020825 A1 * | 2/2007 |

OTHER PUBLICATIONS

Kringston et al.; 'Compositional Effects on the Fracture Behavior of Alkali-Silicate Glasses; Blackwell Science LTD. Fatigue Fract Engng Mater Struct, 23, 685-690.
Morris, D.J., "Indentations Crack Initiation in Ion-exchanged Aluminosilicate Glass," Journal of Materials Science, 39 (2004), pp. 2399-2410.
Gross, T.M., "A Glass with High Crack Initiation Load: Rote of Fictive Temperature-Independent Mechanical Properties," Journal of Non-Crystalline Solids, 355 (2009), pp. 563-568.
Sehgal, Jeetendra, "A New Low-Brittleness Glass in the Soda-Lime-Silica Glass Family," Journal American Ceramic Society, 81 [9] pp. 2485-2488 (1998).
Ito, Setsuro, "Structural Study on Mechanical Behavior of Glass," Journal of the Ceramic Society of Japan, 112 [9] pp. 477-485 (2004).
Kato, Yoshinari, "Effect of Densification on Crack Initiation under Vickers Indentation Test," Journal of Non-Crystalline Solids 356 (2010) pp. 1768-1773.
Rizkalla, A.S., "Effect of Nonbridging Oxygens on the Fracture Toughness of Synthesized Glasses," Br. Ceram. Trans. J., 91, pp. 12-15, 1992.
Yoshida, Satoshi, "Crack Initiation Behavior of Sodium Aluminosilicate Glasses," Journal of Non-Crystalline Solids, 344 (2004) pp. 37-43.
Wilantewicz, Trevor, "Vickers Indentation Fracture in Optical Glass Compositions," Fractrography of Glasses and Ceramics V pp. 131-151.
Wilantewicz, T., "Crack Initiation Behavior of Optical Glasses from Vickers Initiation," pp. 27-39 and 54-56.
Deriano, S., "Physical and Mechanical Properties of a New Borosilicate Glass," Annales de chimie—science des matériaux 28 (2003) pp. 55-62.

(Continued)

*Primary Examiner* — Karl Group
*Assistant Examiner* — Elizabeth A Bolden
(74) *Attorney, Agent, or Firm* — Robert P. Santandrea; Jason A. Baron

(57) ABSTRACT

A silicate glass that is tough and scratch resistant. The toughness is increased by minimizing the number of non-bridging oxygen atoms in the glass. In one embodiment, the silicate glass is an aluminoborosilicate glass in which $-15$ mol $\% \leq (R_2O + R'O - Al_2O_3 - ZrO_2) - B_2O_3 \leq 4$ mol %, where R is one of Li, Na, K, Rb, and Cs, and R' is one of Mg, Ca, Sr, and Ba.

17 Claims, 1 Drawing Sheet

(56) References Cited

OTHER PUBLICATIONS

Deubener, J., "Crack tip fracture toughness of base glasses for dental restoration glass-ceramics using crack opening displacements," Journal of the Mechanical Behavior of biomedical Materials 4 (2011) pp. 1291-1298.

Hornberger, H., "Microstructure of a high strength alumina glass composite," Journal of Materials Research 11(1996) pp. 855-858.

Nakai, T., "Effect of aluminum ions on intrinsic sub-critical crack growth in metaphosphate glasses," Journal of Non-Crystalline Solids 353 (2007) pp. 2250-2257.

Seal, A., "Effect of phase separation on the fracture toughness of $SiO_2$-$B_2O_3$-$Na_2O$ glass," Bulletin of Material Science, 28 (2005) pp. 457-460.

Sehgal, J., "Brittleness of glass," Journal of Non-Crystalline Solids 253 (1999) pp. 126-132.

Simmons, C., "Effects of Phase Separation on Crack Growth in borosilicate Glass," Journal of Non-Crystalline Solids 38&39 (1980) pp. 503-508.

Sugimura, S., "Compositional Dependence of Mechanical Properties in Aluminosilicate, borate and Phosphate Glasses," Journal of the Ceramic Society of Japan 110 (2002) pp. 1103-1108.

Taniguchi, T, " Deformation and fracture of soda-lime-silica glass under tension by molecular dynamics simulation," Journal of the Ceramic Society of Japan 116 (2008) pp. 885-889.

West, J., "Silica fracture," Journal of Materials Science 30 (1995) pp. 6281-6287.

Wilantewicz, T., "The Effects of Lithium, Boron, and Magnesium Oxides on the Mechanical Properties of Silicate Glasses," M.S. Thesis, Alfred University, Jul. 1998, pp. 6-7, 38-47.

Wilantewicz, T., "Crack Initiation Behavior of Optical Glasses from Vickers Initiation," Ph.D. Thesis, Alfred University, Nov. 2005, pp. 27-39 and 54-56.

Yoshida, S., " Crack Growth in the High Crack Velocity Region for Binary Sodium Silicate Glasses," Journal of the Ceramic Society of Japan 108 (2000) pp. 958-951.

\* cited by examiner

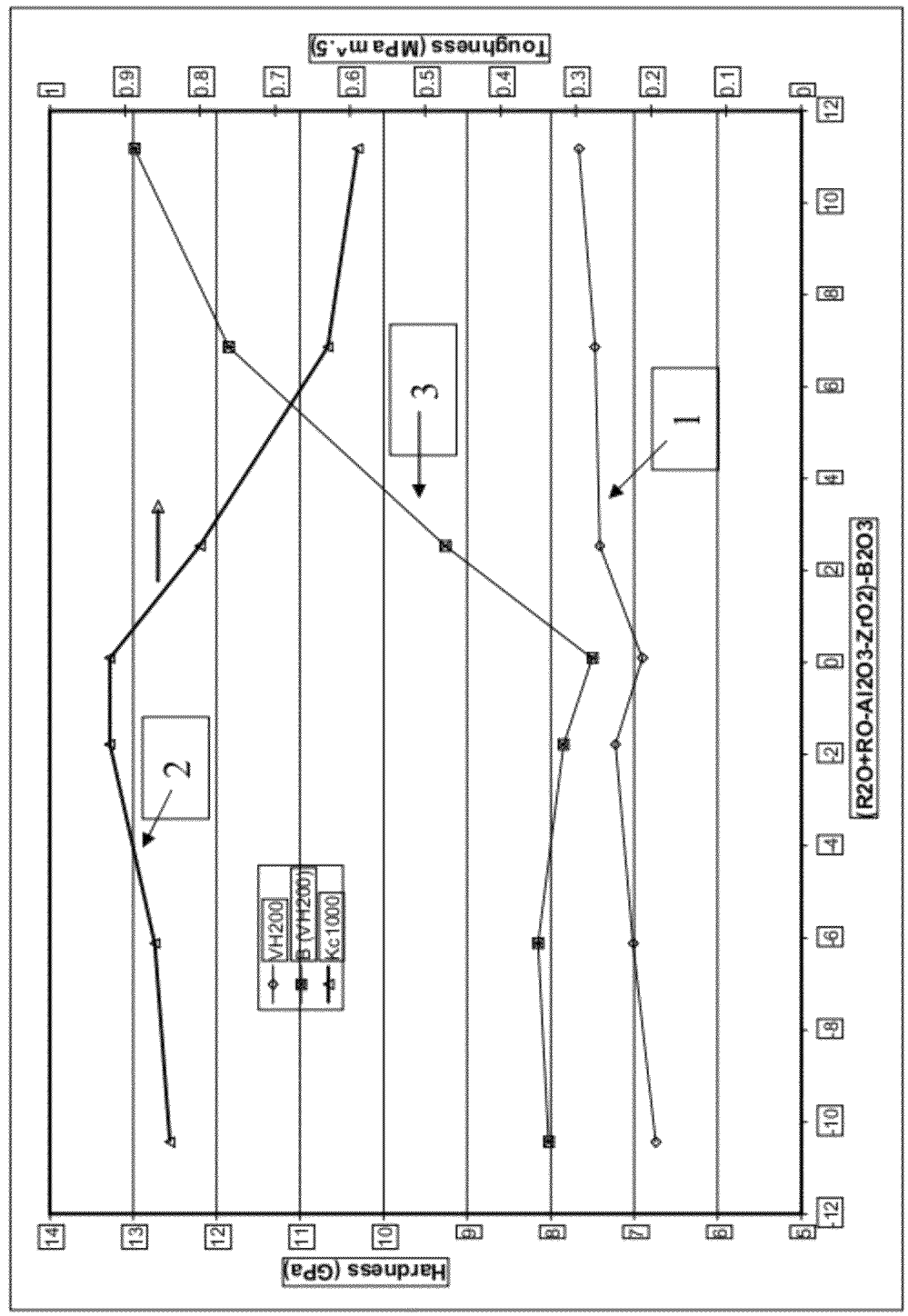

GLASSES HAVING IMPROVED TOUGHNESS AND SCRATCH RESISTANCE

CROSS-REFERENCE TO RELATED APPLICATIONS

This application is a continuation of U.S. patent application Ser. No. 12/277,573 filed on Nov. 25, 2008, the content of which is relied upon and incorporated herein by reference in its entirety, and the benefit of priority under 35 U.S.C. §120 is hereby claimed, which claims the benefit of priority under 35 U.S.C. §119(e) of U.S. Provisional Application Ser. No. 61/004,677 filed on Nov. 29, 2007.

BACKGROUND

The invention relates to silicate glasses. More particularly, the invention relates to silicate glasses in which the content of non-bridging oxygen atoms in the glass is minimized. Even more particularly, the invention relates to such silicate glasses that are scratch resistant and less susceptible to edge chipping.

Glass has the drawback of being brittle. Brittleness is generally is understood to be the ratio of the hardness divided of the glass to its fracture toughness. Such brittleness leads to breakage, defects, and edge chipping, all of which are particularly problematic in applications such as cover plates for mobile electronic devices, touch screens, watch crystals, solar concentrators, windows, screens, containers, and the like. Glass compositions having higher toughness are less brittle, resist crack propagation, and are less prone to other types of damage, such as edge chipping. Softer (i.e., less hard) glasses are less brittle, but are less scratch resistant.

SUMMARY

The present invention provides silicate glasses with improved resistance to scratching and edge chipping. The glasses not only maximize toughness, but allow maximization of hardness without impacting brittleness. In, addition, the glasses are ion exchangeable and down-drawable. The glasses may be used for cover glasses for mobile electronic devices, touch screens, watch crystals, solar concentrators, windows, screens, and containers, as well as other application that require a strong, tough glass.

Accordingly, one aspect of the invention is to provide a silicate glass. The silicate glass comprises at least one of alumina and boron oxide, and at least one of an alkali metal oxide and an alkali earth metal oxide, wherein $-15$ mol $\% \leq (R_2O+R'O-Al_2O_3-ZrO_2)-B_2O_3 \leq 4$ mol %, where R is one of Li, Na, K, Rb, and Cs, and R' is one of Mg, Ca, Sr, and Ba.

A second aspect of the invention is to provide an aluminoborosilicate glass. The aluminosilicate glass has a toughness in a range from about 0.7 MPa m$^{0.5}$ up to about 1.2 MPa m$^{0.5}$ and brittleness of less than about 8.5 µm$^{-0.5}$.

A third aspect of the invention is to provide a silicate glass. The silicate glass comprises: at least one of alumina and boron oxide; and at least one of an alkali metal oxide and an alkali earth metal oxide, wherein $-15$ mol $\% \leq (R_2O+R'O-Al_2O_3-ZrO_2)-B_2O_3 \leq 4$ mol %, where R is one of Li, Na, K, Rb, and Cs, and R' is one of Mg, Ca, Sr, and Ba, and wherein the silicate glass has a toughness in a range from about 0.7 MPa m$^{0.5}$ up to about 1.2 MPa m$^{0.5}$ and a brittleness of less than about 8.5 µm$^{-0.5}$.

A fourth aspect of the invention is to provide a cover plate for an electronic device. The cover plate comprises a silicate glass. The silicate glass comprises at least one of alumina and boron oxide and at least one of an alkali metal oxide and an alkali earth metal oxide, wherein $-15$ mol % $(R_2O+R'O-Al_2O_3-ZrO_2)-B_2O_3 \leq 4$ mol %, where R is one of Li, Na, K, Rb, and Cs, and R' is one of Mg, Ca, Sr, and Ba.

A fifth aspect of the invention is to provide an aluminoborosilicate glass. The aluminoborosilicate glass comprises a plurality of non-bridging oxygen atoms (NBOs), wherein the plurality of non-bridging oxygen atoms NBO is given by NBO=$R_2O+R'O-Al_2O_3-ZrO_2$, wherein $R_2O$, R'O, $Al_2O_3$, and $ZrO_2$ are expressed in mol %, wherein R is one of Li, Na, K, Rb, and Cs, and R' is one of Mg, Ca, Sr, and Ba, and wherein $-15$ mol % $\leq$ NBO—$B_2O_3 \leq 3$ mol %.

These and other aspects, advantages, and salient features of the present invention will become apparent from the following detailed description, the accompanying drawings, and the appended claims.

BRIEF DESCRIPTION OF THE DRAWING

FIG. 1 is a plot of hardness, toughness and brittleness of glass compositions as a function of the difference in the concentration or content of excess modifiers $R_2O$ (R=Li, Na, K, Rb, Cs) and R'O (R'=Mg, Ca, Sr, Ba), and boron oxide ($B_2O_3$).

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to FIG. 1, it will be understood that the illustration is intended for the purpose of describing a particular embodiment of the invention and is not intended to limit the invention thereto.

Glass has the drawback of being brittle. Brittleness leads to the problems of breakage, defects, and edge chipping. The brittleness of a material is often referred to in the art as the ratio of the hardness of the material to its fracture toughness. Glasses having a higher degree of toughness are therefore less brittle and have a greater resistance to crack propagation and scratching.

The present invention provides a silicate glass having high toughness and lower brittleness. The silicate glass comprises at least one of alumina ($Al_2O_3$) and boron oxide ($B_2O_3$) and, in one embodiment, comprises both alumina and boron oxide. In addition, the silicate glass comprises at least one of an alkali metal oxide (also referred to herein as an "alkali oxide") having the general formula $R_2O$ and an alkali earth metal oxide (also referred to herein as an "alkali earth oxide") having the general formula R'O, where $-15$ mol % $\leq (R_2O+R'O-Al_2O_3-ZrO_2)-B_2O_3 \leq 4$ mol %, wherein $R_2O$, R'O, $Al_2O_3$, and $ZrO_2$ represent the amounts or concentrations of the respective oxides expressed in mol %. In one embodiment, $-5$ mol % $\leq (R_2O+R'O-Al_2O_3-ZrO_2)-B_2O_3 \leq 4$ mol %. Unless otherwise specified, the term "alkali metal" refers to the Group IA metals lithium (Li), sodium (Na), potassium (K), rubidium (Rb), and cesium (Cs), and the term "alkali earth metal" refers to the Group IIA metals magnesium (Mg), calcium (Ca), strontium (Sr), and barium (Ba). Unless otherwise specified, the concentrations of the components of the glass are expressed in mole percent (mol %).

The silicate glasses described herein are glasses in which non-bridging oxygen atoms (NBOs) have been minimized to increase the toughness of the glass. The number of NBOs can be approximately described by the equation $NBO=R_2O+R'O-Al_2O_3-B_2O_3-ZrO_2$, wherein the amounts or concentrations of $R_2O$, $R'O$, $Al_2O_3$, and $ZrO_2$ are expressed in mole percent (mol %), and where R is an alkali metal (Li, Na, K, Rb, Cs) and R' is an alkali earth metal (Mg, Ca, Sr, Ba). The presence of more NBOs typically decreases the melting temperature of the glass, thus facilitating melting, especially without the use of toxic fining agents such as $As_2O_3$ and $Sb_2O_3$. Such modifier-rich glasses (i.e., glasses having relatively high concentrations of $R_2O$ and $R'O$) also have low toughness and high hardness and are hence quite brittle.

In one embodiment, the silicate glass does not comprise $B_2O_3$ (i.e., $B_2O_3=0$ mol %) and $-15$ mol % $(R_2O+R'O-Al_2O_3-ZrO_2) \leq 4$ mol %. In another embodiment, $-5$ mol % $\leq (R_2O+R'O-Al_2O_3-ZrO_2) \leq 4$ mol %. In these instances, the number—or concentration—of NBOs is minimized by balancing the alkali and alkali earth oxides with alumina and zirconia alone.

In another embodiment, the addition of $B_2O_3$ to these modifier-rich glasses associates with—or "ties up"—the NBOs with $B^{3+}$ ions. The NBOs are converted to bridging oxygen atoms through formation of $BO_4$ tetrahedra, resulting in a glass that is tougher and still easy to melt. Thus, to minimize the NBO level, the optimal amount of $B_2O_3$ that should be present in a glass should be approximately equal to the concentration of excess modifiers in the glass—i.e., $B_2O_3$=Excess modifiers=$R_2O+R'O-Al_2O_3-ZrO_2$.

While the hardness increases linearly with increasing excess modifier, the toughness goes through a maximum near 0, which is the point at which the excess modifier content is equal to the $B_2O_3$ content and the NBOs are consumed in $BO_4$ tetrahedra. Since the toughness is at a maximum near $(R_2O+R'O-Al_2O_3-ZrO2)-B_2O_3=0$, the brittleness is desirably minimized. Such glasses are much more resistant to damage, scratching, and edge chipping than those glasses with higher degrees of brittleness.

Glasses having extra $B_2O_3$ create trigonal $BO_3$ groups rather than tetrahedral $BO_4$ groups. In FIG. 1, hardness (line (1) in FIG. 1, expressed in GPa), toughness (line (2) in FIG. 1, expressed in MPa m$^{0.5}$), and brittleness (line (3) in FIG. 1, expressed in $\mu m^{-0.5}$) are plotted as functions of excess modifiers minus $B_2O_3$ (i.e., $(R_2O+R'O-Al_2O_3-ZrO_2)-B_2O_3$). As seen in FIG. 1, the hardness increases linearly with increasing excess modifier, while the toughness goes through a maximum near 0, at which point the excess modifier content is equal to the $B_2O_3$ content and the NBOs are consumed in $BO_4$ tetrahedra. Since the toughness is at a maximum near $(R_2O+R'O-Al_2O_3-ZrO_2)-B_2O_3=0$, the brittleness is desirably minimized, yielding glass that is much more robust against damage and edge chipping. The presence of excess $B_2O_3$ (i.e., $(R_2O+R'O-Al_2O_3-ZrO_2)-B_2O_3<0$ mol %)—and thus low NBO levels—yields a glass having a higher level of toughness. In contrast, the presence of excess modifiers (i.e., $(R_2O+R'O-Al_2O_3-ZrO_2)-B_2O_3>0$ mol %) yields glasses having lower levels of toughness, due to the larger number of NBOs that are formed by alkali and alkali earth metal oxides. In addition, glasses having higher levels of modifiers have greater hardness. The combination of lower toughness and higher hardness of high NBO glasses results in high brittleness values, which is undesirable.

In one embodiment, the silicate glass has a toughness in a range from about 0.7 MPa m$^{0.5}$ up to about 1.2 MPa m$^{0.5}$. In another embodiment, the toughness is in a range from about 0.8 MPa m$^{0.5}$ up to about 1.0 MPa m$^{0.5}$.

In one embodiment, the silicate glass has a hardness in a range from about 6 GPa up to about 8 GPa. As previously described, brittleness is defined as the ratio of toughness to hardness. In one embodiment, the silicate glass has a brittleness of less than about 8.5 $\mu m^{-0.5}$. In another embodiment, the silicate glass has a brittleness of less than about 7 $\mu m^{-0.5}$.

Glasses in which $B_2O_3=NBO=R_2O+R'O-Al_2O_3-ZrO_2$ may also be made with very low liquidus temperatures (Table I) and have very high liquidus viscosities. As used herein, the term "liquidus viscosity" refers to the viscosity of a molten glass at the liquidus temperature, wherein the liquidus temperature refers to the temperature at which the very last crystals melt away as temperature is increased from room temperature. These properties permit these silicate glasses to be down-drawable; i.e., the glass is capable of being formed into sheets using down-draw methods such as, but not limited to, fusion draw and slot draw methods that are known to those skilled in the art. Such down-draw processes are used in the large-scale manufacture of ion-exchangeable flat glass. In one embodiment, the liquidus viscosity is at least 100 kilopoise (kpoise). In another embodiment, the liquidus viscosity is at least 160 kpoise, and, in a third embodiment, the liquidus viscosity is at least 220 kpoise.

The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties of the glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet therethrough and into an annealing region. Compared to the fusion draw process, the slot draw process provides a thinner sheet, as only a single sheet is drawn through the slot, rather than two sheets being fused together, as in the fusion down-draw process.

The silicate glass comprises 62-70 mol % $SiO_2$; 0-18 mol % $Al_2O_3$; 0-10 mol % $B_2O_3$; 0-15 mol % $Li_2O$; 0-20 mol % $Na_2O$; 0-18 mol % $K_2O$; 0-17 mol % MgO; 0-18 mol % CaO; and 0-5 mol % $ZrO_2$, wherein 14 mol % $\leq R_2O+R'O \leq 25$ mol %, where R is Li, Na, K, Cs, or Rb, and R' is Mg, Ca, Ba, or Sr; 10 mol % $\leq Al_2O_3+B_2O_3+ZrO_2 \leq 30$ mol %; and $-15$ mol % $\leq (R_2O+R'O-Al_2O_3-ZrO_2)-B_2O_3 \leq 4$ mol %. Other oxides such as, but not limited to, ZnO, $SnO_2$, $Sb_2O_3$, $As_2O_3$, $La_2O_3$, $Y_2O_3$, $Fe_2O_3$, and the like may also be individually added to the glass in amounts less than 5 mol %. In one embodiment, the silicate glass is an aluminoborosilicate glass: i.e., the glass comprises both alumina and boron oxide. In one embodiment, the aluminoborosilicate glass comprises: 64-66 mol % $SiO_2$; 8-12 mol % $Al_2O_3$; 1-11 mol % $B_2O_3$; 0-5 mol % $Li_2O$; 6-12 mol % $Na_2O$; 1-4 mol % $K_2O$; 0-4 mol % MgO; 0-6 mol % CaO; and 0-2 mol % $ZrO_2$, where 20 mol %≤$R_2O$+R'O≤24 mol %; and 16 mol %≤$Al_2O_3$+$B_2O_3$+$ZrO_2$≤29 mol %. Table 1 lists non-limiting examples of silicate glass compositions of the present invention and their properties.

Alumina ($Al_2O_3$) and, to a lesser extent, zirconia ($ZrO_2$) have the opposite effect of the alkali metal oxides. In addition, $Al_2O_3$ scavenges NBOs to form $AlO_4$ tetrahedra while making the glass thermally harder. Alumina and zirconia also provide lower expansion and greater durability but, at high concentrations, make the glass more difficult to melt. In most ion exchangeable glasses, $R_2O$>$Al_2O_3$, since glasses in which $R_2O$=$Al_2O_3$ are very difficult to melt unless $B_2O_3$ is present.

TABLE 1

| | 196 | 1 | 2 | 3 | 4 | 5 | 6 | 7 |
|---|---|---|---|---|---|---|---|---|
| | SiO2 | 65.75 | 65.43 | 65.11 | 65.23 | 64.80 | 64.48 | 64.16 |
| | Al2O3 | 11.33 | 10.84 | 10.36 | 11.1 | 9.87 | 9.39 | 8.90 |
| | Li2O | 4.57 | 3.66 | 2.74 | 2.3 | 1.83 | 0.91 | 0.00 |
| | Na2O | 6.22 | 7.66 | 9.10 | 9.805 | 10.53 | 11.97 | 13.41 |
| | K2O | 1.11 | 1.75 | 2.40 | 2.715 | 3.04 | 3.69 | 4.33 |
| | MgO | 0.00 | 0.74 | 1.49 | 2.41 | 2.23 | 2.98 | 3.72 |
| | CaO | 0.00 | 0.32 | 0.65 | 0.125 | 0.97 | 1.30 | 1.62 |
| | B2O3 | 11.01 | 9.01 | 7.01 | 6.165 | 5.00 | 3.00 | 1.00 |
| | ZrO2 | 0.00 | 0.40 | 0.80 | 0 | 1.20 | 1.60 | 2.00 |
| | SnO2 | 0.25 | 0.25 | 0.25 | 0.15 | 0.25 | 0.25 | 0.25 |
| | TOTAL | 100.24 | 100.07 | 99.90 | 100.00 | 99.73 | 99.56 | 99.39 |
| | R2O + RO —Al2O3—ZrO2—B2O3 | −10.44 | −6.116 | −1.792 | 0.09 | 2.532 | 6.856 | 11.18 |
| GPa | E | 66.4 | 71.8 | 74.7 | | 76.1 | 75.2 | 74.8 |
| GPa | VH$_{1000}$ | 5.70 | 6.71 | 6.23 | 6.39 | 6.76 | 6.70 | 7.37 |
| μm$^{-0.5}$ | B$_{1000}$ | 6.8 | 7.8 | 6.8 | 6.9 | 8.5 | 10.6 | 12.5 |
| | Strain (° C.) | 486 | 481 | 489 | 489 | 501 | 517 | 546 |
| | Anneal (° C.) | 536 | 525 | 533 | 533 | 546 | 564 | 594 |
| | Soft (° C.) | 785 | 743 | 750 | | 761 | 784 | 816 |
| | CTE | 62.2 | 66.6 | 74.1 | | 81.4 | 87.6 | 94 |
| | Density | 2.323 | 2.38 | 2.426 | 2.414 | 2.467 | 2.5 | 2.525 |
| | Liquidus Temp | 1240 | 1050 | 825 | 840 | 855 | 730 | 730 |
| | Liq Visc (kP) | 8 | 42 | 3802 | | 2344 | 200255 | 1454433 |
| | 200P (° C.) | 1637 | 1595 | 1574 | | 1550 | 1535 | 1549 |

The details on the role of each glass component will now be described. Silicate glasses with minimal levels or concentrations of NBOs show the highest toughness and will occur at compositions at or near $B_2O_3$=NBO=$R_2O$+R'O—$Al_2O_3$—$ZrO_2$.

The largest single constituent of the alkali aluminosilicate glass is $SiO_2$, which forms the matrix of the glass and is present in the inventive glasses in a concentration ranging from about 62 mol % up to and including about 70 mol %. $SiO_2$ serves as a viscosity enhancer that aids formability and imparts chemical durability to the glass. At concentrations that are higher than the range given above, $SiO_2$ raises the melting temperature prohibitively, whereas glass durability suffers at concentrations below the range. In addition, lower $SiO_2$ concentrations can cause the liquidus temperature to increase substantially in glasses having high alkali or alkali earth oxide concentrations.

The greater alkali metal oxide content facilitates melting, softens the glass, enables ion exchange, decreases melt resistivity, and breaks up the glass network which increases thermal expansion and decreases durability. Mixtures of alkali metal oxides help depress the liquidus temperature and may enhance ion exchange as well. While $Li_2O$ provides fast ion exchange, low density, and high modulus, it is also quite expensive. $Na_2O$ is very desirable for ion exchange with $K^+$ ions for chemical strengthening and makes stable glasses with respect to devitrification. Small amounts of $K_2O$ relative to $Na_2O$ actually help increase the rate of $K^+$ for $Na^+$ ion exchange and decrease liquidus, but also increase the thermal expansivity of the glass.

Alkaline earth oxides help create a steeper viscosity curve for the glasses. Replacing alkali metal oxides with alkaline earth metal oxides generally raise the anneal and strain points of the glass while lowering the melting temperatures needed to make high quality glass. MgO and CaO are less expensive than SrO and BaO and do not increase the density as much as the heavier oxides. BaO is also considered to be a hazardous or toxic material, and its presence is therefore undesirable. Accordingly, in one embodiment, the glass is substantially free of barium. Large amounts of MgO tend to increase the liquidus temperature, as the oxide is prone to form forsterite ($Mg_2SiO_4$) at low MgO concentrations in sodium aluminosilicate glasses.

$B_2O_3$ may be used as a flux to soften glasses, making them easier to melt. $B_2O_3$ also helps scavenge non-bridging oxygen atoms (NBOs), which are created when the amount or concentration of modifiers exceeds that of $Al_2O_3$. $B_2O_3$ converts the NBOs to bridging oxygen atoms through the formation of $BO_4$ tetrahedra, which increases the toughness of the glass by minimizing the number of weak NBOs. $B_2O_3$ also lowers the hardness of the glass which, when coupled with the higher toughness, decreases the brittleness, thereby resulting in a mechanically durable glass.

In one embodiment, the alkali aluminosilicate glass described herein is substantially free of lithium. As used herein, "substantially free of lithium" means that lithium is not intentionally added to the glass or glass raw materials during any of the processing steps leading to the formation of the alkali aluminosilicate glass. It is understood that an alkali aluminosilicate glass or an alkali aluminosilicate glass article that is substantially free of lithium may inadvertently contain small amounts of lithium due to contamination. The absence of lithium reduces poisoning of ion exchange baths, and thus reduces the need to replenish the salt supply needed to chemically strengthen the glass. In addition, due to the absence of lithium, the glass is compatible with continuous unit (CU) melting technologies such as the down-draw processes described above and the materials used therein, the latter including both fused zirconia and alumina refractories and zirconia and alumina isopipes.

In one embodiment, the silicate glass comprises at least one alkali metal oxide and is ion exchangeable. As used herein, the term "ion-exchangeable" is understood to mean that the glass is capable of being strengthened by ion exchange processes that are known to those skilled in the art. Such ion exchange processes include, but are not limited to, treating the heated alkali aluminosilicate glass with a heated solution containing ions having a larger ionic radius than ions that are present in the glass surface, thus replacing the smaller ions with the larger ions. Potassium ions, for example, could replace sodium ions in the glass. Alternatively, other alkali metal ions having larger atomic radii, such as rubidium or cesium, could replace smaller alkali metal ions in the glass. Alternatively, the smaller alkali metal ions could be replaced by $Ag^+$ ions. Similarly, other alkali metal salts such as, but not limited to, sulfates, halides, and the like may be used in the ion exchange process. In one embodiment, the down-drawn glass is chemically strengthened by placing it a molten salt bath comprising $KNO_3$ for a predetermined time period to achieve ion exchange. In one embodiment, the temperature of the molten salt bath is about 430° C. and the predetermined time period is about eight hours.

Down-draw processes produce surfaces that are relatively pristine. Because the strength of the glass surface is controlled by the amount and size of surface flaws, a pristine surface that has had minimal contact has a higher initial strength. When this high strength glass is then chemically strengthened, the resultant strength is higher than that of a surface that has been a lapped and polished. Chemical strengthening or tempering by ion exchange also increases the resistance of the glass to flaw formation due to handling. Down-drawn glass may be drawn to a thickness of less than about 2 mm. In addition, down drawn glass has a very flat, smooth surface that can be used in its final application without costly grinding and polishing. In one embodiment, the down-drawable glass has a liquidus viscosity of at least 100 kpoise. In another embodiment, the liquidus viscosity is at least 160 kpoise, and, in a third embodiment, the liquidus viscosity is at least 220 kpoise.

Surface compressive stress refers to a stress caused by the substitution during chemical strengthening of an alkali metal ion contained in a glass surface layer by another alkali metal ion having a larger ionic radius. In one embodiment, potassium ions are substituted for sodium ions in the surface layer of the glass described herein. The glass has a surface compressive stress of at least about 200 MPa. In one embodiment, the surface compressive stress is at least about 600 MPa. The alkali aluminosilicate glass has a compressive stress layer that has a depth of at least about 30 μm and, in another embodiment, the depth of the compressive stress layer is at least about 40 μm.

The replacement of smaller ions by larger ions at a temperature below that at which the glass network can relax produces a distribution of ions across the surface of the glass that results in a stress profile. The larger volume of the incoming ion produces compressive stress (CS) on the surface and tension in the center (CT) of the glass. The compressive stress is related to the central tension by the following relationship:

$$CS = CT \times (t - 2DOL)/DOL;$$

where t is the thickness of the glass and DOL is the depth of exchange, also referred to as depth of layer.

In addition to the elements described above, other elements and compounds may be added to eliminate or reduce defects within the glass. The glasses of the present invention tend to exhibit 200 Poise viscosities that are relatively high, between about 1500° C. and 1675° C. Such viscosities are typical of industrial melting processes, and in some cases melting at such temperatures may be required to obtain glass with low levels of inclusions. To aid in eliminating gaseous inclusions, it may be useful to add chemical fining agents. Such fining agents fill early-stage bubbles with gas, thus increasing their rise velocity through the melt. Typical fining agents include, but are not limited to: oxides of arsenic, antimony, tin and cerium; metal halides (fluorides, chlorides and bromides); metal sulfates; and the like. Arsenic oxides are particularly effective fining agents because they release oxygen very late in the melt stage. However, arsenic and antimony are generally regarded as hazardous materials. Accordingly, in one embodiment, the glass is substantially free of antimony and arsenic, comprising less than about 0.05 wt % or about 0.05 mol % of each of the oxides of these elements. Therefore, it may be advantageous in particular applications to completely avoid using arsenic or antimony, and instead using a nontoxic component such as tin oxides, halides or sulfates to produce a fining effect. Tin (IV) oxide ($SnO_2$) and combinations of tin (IV) oxide with at least one of cerium (IV) oxide and halides are particularly useful as fining agents in the present invention.

The glasses of the present invention have properties which are unexpected in light of the prior art. While soda lime silica glasses having decreased brittleness have been previously described, such glasses are neither fusion formable nor ion exchangeable to depths of layer of 20 μm. Moreover, the glasses of the prior art are not as hard as the glasses described herein.

In addition to maximizing toughness, the silicate glasses described herein also allow hardness to be maximized without increasing brittleness. High levels of hardness provide greater scratch resistance. However, higher hardness increases brittleness unless toughness is correspondingly increased. Thus, if high levels of hardness can be accompanied by increased toughness, the resulting glass will have both increased scratch resistance and low brittleness. The silicate glass is resistant to both chipping and scratching, making it well suited for use in cover plates, touch screens, watch crystals, solar concentrators, windows, screens, containers, and other applications which require strong and tough glass with good scratch resistance.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A silicate glass, the silicate glass being ion exchangeable and comprising:
   a. alumina and boron oxide; and
   b. at least one alkali metal oxide, wherein $-15$ mol $\% \leq (R_2O + R'O - Al_2O_3 - ZrO_2) - B_2O_3 \leq 4$ mol %, where R is at least one of Li, Na, K, Rb, and Cs, and R' is at least one of Mg, Ca, Sr, and Ba;

c. $10 \leq Al_2O_3+B_2O_3+ZrO_2 \leq 30$; and
d. $14 \leq R_2O+R'O \leq 25$, wherein the silicate glass comprises 62-70 mol. % $SiO_2$; >0-18 mol % $Al_2O_3$; >0-10 mol % $B_2O_3$; 0-15 mol % $Li_2O$; 6-14 mol % $Na_2O$; 0-18 mol % $K_2O$; 0-17 mol % MgO; 0-18 mol % CaO; and 0-5 mol % $ZrO_2$.

2. The silicate glass according to claim 1, wherein the silicate glass is substantially free of lithium.

3. The silicate glass according to claim 1, wherein the silicate glass is substantially free of antimony and arsenic oxides.

4. The silicate glass of claim 1, wherein $-5$ mol % $\leq (R_2O+R'O-Al_2O_3-ZrO_2)-B_2O_3 \leq 4$ mol %.

5. The silicate glass according to claim 1, wherein the silicate glass comprises: 64-66 mol % $SiO_2$; 8-12 mol % $Al_2O_3$; 1-10 mol % $B_2O_3$; 0-5 mol % $Li_2O$; 6-12 mol % $Na_2O$; 1-4 mol % $K_2O$; 0-4 mol % MgO; 0-6 mol % CaO; and 0-2 mol % $ZrO_2$.

6. The silicate glass according to claim 5, wherein 20 mol % $\leq R_2O+R'O \leq 24$ mol %.

7. The silicate glass according to claim 5, wherein 16 mol % $\leq Al_2O_3+B_2O_3+ZrO_2 \leq 29$ mol %.

8. The silicate glass according to claim 1, wherein the silicate glass has a toughness in a range from about 0.7 MPa $m^{0.5}$ up to about 1.2 MPa $m^{0.5}$.

9. The silicate glass according to claim 8, wherein the silicate glass has a brittleness of less than about 8.5 $\mu m^{-0.5}$.

10. The silicate glass according to claim 1, wherein the silicate glass has a liquidus viscosity of at least 100 kpoise.

11. The silicate glass according to claim 10, wherein the silicate glass is down-drawable.

12. The silicate glass according to claim 1, wherein the silicate glass has a thickness in a range from about 0.3 mm up to about 1.5 mm.

13. The silicate glass according to claim 1, wherein the silicate glass, when ion exchanged, has a surface compressive stress of at least about 200 MPa and a surface compressive layer, the surface compressive layer having a depth of at least about 30 $\mu m$.

14. The silicate glass according to claim 13, wherein the at least one alkali metal oxide in the silicate glass is ion exchanged with at least one of sodium ions, silver ions, potassium ions, cesium ions, and rubidium ions.

15. A silicate glass, the silicate glass having a toughness in a range from about 0.7 MPa $m^{0.5}$ up to about 1.2 MPa $m^{0.5}$, a brittleness of less than about 8.5 $\mu m^{-0.5}$, and wherein the silicate glass comprises $Al_2O_3$, $B_2O_3$, at least one alkali metal oxide, $-15$ mol % $\leq (R_2O+R'O-Al_2O_3-ZrO_2)-B_2O_3 \leq 4$ mol %, where R is at least one of Li, Na, K, Rb, and Cs, and R' is at least one of Mg, Ca, Sr, and Ba, wherein the silicate glass comprises: 64-66 mol % $SiO_2$; 8-12 mol % $Al_2O_3$; 1-10 $B_2O_3$; 0-5 mol % $Li_2O$; 6-12 mol % $Na_2O$; 1-4 mol % $K_2O$; 0-4 mol % MgO; 0-6 mol % CaO; and 0-2 mol % $ZrO_2$.

16. The silicate glass according to claim 15, wherein 20 mol % $\leq R_2O+R'O \leq 24$ mol %.

17. The silicate glass according to claim 15, wherein 16 mol % $\leq Al_2O_3+B_2O_3+ZrO_2 \leq 29$ mol %.

* * * * *